(12) United States Patent
Kim

(10) Patent No.: US 10,406,490 B2
(45) Date of Patent: Sep. 10, 2019

(54) FLOW CONTROL DEVICE FOR MITIGATING THERMAL STRATIFICATION IN MIXING TEE PIPE

(71) Applicant: KEPCO ENGINEERING AND CONSTRUCTION COMPANY, INC., Gyeongsangbuk-do (KR)

(72) Inventor: Kwangchu Kim, Gyeonggi-do (KR)

(73) Assignee: KEPCO ENGINEERING & CONSTRUCTION COMPANY, INC., Gyeonggi-Do (KR)

( * ) Notice: Subject to any disclaimer, the term of this patent is extended or adjusted under 35 U.S.C. 154(b) by 80 days.

(21) Appl. No.: 15/710,787

(22) Filed: Sep. 20, 2017

(65) Prior Publication Data
US 2018/0117542 A1    May 3, 2018

(30) Foreign Application Priority Data
Nov. 1, 2016 (KR) .......................... 10-2016-0144477

(51) Int. Cl.
*B01F 5/04* (2006.01)
*B01F 5/06* (2006.01)
*F16L 41/02* (2006.01)
*F16L 55/07* (2006.01)

(52) U.S. Cl.
CPC .......... *B01F 5/0485* (2013.01); *B01F 5/0689* (2013.01); *F16L 41/021* (2013.01); *F16L 55/07* (2013.01)

(58) Field of Classification Search
CPC ...... B01F 5/0689; B01F 5/006; B01F 5/0644; B01F 5/0256; B01F 5/0485; B01F 5/0453; B01F 3/081; B01F 3/0861; F28F 13/125; F01N 2470/04

USPC ................................. 366/165.2, 340; 60/649
See application file for complete search history.

(56) References Cited

U.S. PATENT DOCUMENTS

| 4,209,493 | A | * | 6/1980 | Olson | ....................... F01N 1/08 |
| | | | | | 422/176 |
| 4,538,413 | A | * | 9/1985 | Shinzawa | ............. F01N 3/0256 |
| | | | | | 431/248 |
| 7,793,490 | B2 | * | 9/2010 | Amon | .................... F01N 3/2066 |
| | | | | | 60/286 |
| 8,230,686 | B2 | * | 7/2012 | Banas | .................... B01F 3/0861 |
| | | | | | 60/646 |

(Continued)

FOREIGN PATENT DOCUMENTS

WO    91005967    5/1991

*Primary Examiner* — Tony G Soohoo
*Assistant Examiner* — Elizabeth Insler
(74) *Attorney, Agent, or Firm* — Schwabe Williamson & Wyatt, P.C.

(57) ABSTRACT

A flow control device for mitigating thermal stratification in a mixing tee pipe includes a mixing bowl provided as an empty sphere; a main pipe having a tubular shape, through which a fluid flows, and coupled to the mixing bowl in linkage with the mixing bowl; a branch pipe having a tubular shape, through which a fluid flows, and coupled to the mixing bowl in linkage with the mixing bowl; and a mixing tee pipe having a tubular shape, through which the fluid in the mixing bowl flows, and coupled to the mixing bowl in linkage with the mixing bowl, wherein a fluid introduced from the main pipe and a fluid introduced from the branch pipe are mixed in the mixing bowl and discharged through the mixing tee pipe.

7 Claims, 6 Drawing Sheets

(56) References Cited

U.S. PATENT DOCUMENTS 9,726,117 B2    8/2017  Schroder
2011/0094206 A1* 4/2011  Liu ...................... F01N 3/2066
                                                    60/274

* cited by examiner (Background)

(Background)

(Background)

FLOW CONTROL DEVICE FOR MITIGATING THERMAL STRATIFICATION IN MIXING TEE PIPE

CROSS-REFERENCE TO RELATED APPLICATION

This application claims the benefit of Korean Patent Application No. 10-2016-0144477, filed on Nov. 1, 2016, in the Korean Intellectual Property Office, the disclosure of which is incorporated herein in its entirety by reference.

BACKGROUND

1. Field

One or more embodiments relate to a flow control device for mitigating thermal stratification in a mixing tee pipe, and more particularly, to a flow control device for mitigating generation of thermal stratification in a mixing tee pipe in which a fluid of high temperature and a fluid of low temperature are mixed, so as to prevent damages caused by bending stress and thermal fatigue caused by the thermal stratification.

2. Description of the Related Art

In general, mixing tee pipes in which a fluid at a high temperature and a fluid at a low temperature are mixed are used in various industrial plants for nuclear power plants, thermal power plants, chemical plants, etc. However, the mixing tee pipe may be subjected to a bending stress due to a difference between thermal expansion rates of upper and lower ends of the pipe, and thus, pipes and a support thereof may be severely deformed. In particular, cracks may occur due to thermal fatigue that is regularly repeated.

FIG. 1 is a diagram of a mixing tee pipe according to the related art. Referring to FIG. 1, the mixing tee pipe according to the related art includes a main pipe 10, into which a fluid at a high temperature is introduced, and a branch pipe 20, into which a fluid at a low temperature is introduced. In the mixing tee pipe according to the related art, thermal stratification occurs in an area where the main pipe 10 and the branch pipe 20 meet each other, due to a temperature difference between the fluid at a high temperature and the fluid at a low temperature. According to the generation of thermal stratification, a difference between the thermal expansion rates of the upper and lower ends of the pipe occurs and bending stress is generated in the pipe, which may damage the pipe. Also, cracks may occur in the pipe due to the thermal fatigue that regularly and repeatedly occurs.

To address the above problems, a mixing tee pipe as shown in FIGS. 2 and 3 is provided according to the related art. The mixing tee pipe illustrated in FIG. 2 is used in Civaux-1 nuclear power reactor in France, and includes a high temperature pipe 30, a low temperature pipe 40, a thermal exchanger 41, and a mixing tee pipe 50 disposed away from the high temperature pipe 30 and the low temperature pipe 40. In FIG. 2, the mixing tee pipe 50 is provided away from the high temperature pipe 30 and the low temperature pipe 40 as far as possible, in order to adjust a location of generating a crack portion 60.

However, the mixing tee pipe 50 according to the related art may not basically prevent thermal stratification, and just increases a distance to the crack portion 60. A method of arranging a portion (crack portion 60) vulnerable to thermal stratification/thermal fatigue away from an affecting point requires a three-dimensional analysis, and accordingly, pipes may need to be newly arranged.

FIG. 3 shows a mixing tee pipe for mitigating thermal stratification by arranging separate tubes 71 and 81 in an area where a high temperature pipe 70 and a low temperature pipe 80 are combined. The mixing tee pipe illustrated in FIG. 3 has a high temperature separate tube 71, through which a fluid from the high temperature pipe 70 may pass, and a low temperature separate tube 81, through which a fluid from the low temperature pipe 80 may pass, in order to prevent thermal stratification from occurring.

However, forming the separate tubes 71 and 81 does not prevent thermal stratification, but only mitigates thermal stratification by allowing the high temperature fluid and the low temperature fluid to flow via additional long flow paths. As described above, in the method of forming the separate tubes 71 and 81 having long flow paths, long paths have to be formed to an outlet, and thus, the method is not only economically inefficient, but also there is a risk of leakage from internal tubes. Also, the above separate tubes method is not efficient in a case wherein use of a fluid having an average temperature is necessary.

SUMMARY

One or more embodiments include a flow control device for mitigating thermal stratification in a mixing tee pipe, wherein thermal stratification is mitigated by installing a mixing ball and a device installed in the mixing ball in the mixing tee pipe where a fluid of high temperature and a fluid of low temperature are mixed so as to prevent damages caused by a bending stress caused by thermal stratification and thermal fatigue.

Additional aspects will be set forth in part in the description which follows and, in part, will be apparent from the description, or may be learned by practice of the presented embodiments.

According to one or more embodiments, a flow control device for mitigating thermal stratification in a mixing tee pipe, the flow control device includes: a mixing bowl having an empty sphere shape; a main pipe having a tubular shape and connected to the mixing bowl, wherein a fluid flows through the main pipe; a branch pipe having a tubular shape and connected to the mixing bowl, wherein a fluid flows through the branch pipe; and a mixing tee pipe having a tubular shape, through which a fluid in the mixing bowl flow, and connected to the mixing bowl, wherein the fluid introduced from the main pipe and the fluid introduced from the branch pipe are mixed in the mixing bowl and are discharged through the mixing tee pipe.

The flow control device may further include: an ejector and a mixer arranged in the mixing bowl, wherein the ejector may have an empty cylindrical shape and is disposed in an area where the main pipe and the mixing bowl are connected to each other, the ejector may have an open bottom surface in communication with the main pipe and include a plurality of first holes in a side surface and a top surface thereof, the mixer may have an empty cylindrical shape and is disposed in an area where the mixing tee pipe and the mixing bowl are connected to each other, and the mixer may include a plurality of second holes in a side surface thereof and a plurality of third holes in a top surface thereof, so that the mixer may communicate with the mixing tee pipe through the plurality of third holes.

The plurality of first holes may have different diameters from one another, the plurality of second holes may have different diameters from one another, and the plurality of third holes have different diameters from one another. The ejector and the mixer arranged in the mixing bowl may be spaced apart from each other to form a separate space therebetween.

The plurality of first holes in the ejector may include first side surface holes formed in the side surface of the ejector and a first top surface hole formed in the top surface of the ejector, wherein the first side surface holes may include first upper side holes and first lower side holes located under the first upper side holes, and the first lower side holes may have same diameter and the first upper side holes have diameters that are gradually reduced from a direction facing the branch pipe to a direction opposite the direction facing the branch pipe. The plurality of first holes in the ejector may include first side surface holes formed in the side surface of the ejector and a first top surface hole formed in the top surface of the ejector, and the first top surface hole may include one hole provided in a side of the branch pipe.

The plurality of second holes of the mixer may have diameters that are gradually increased from a direction facing the branch pipe to a direction opposite the direction facing the branch pipe. The plurality of first holes of the ejector may include first side surface holes formed in the side surface of the ejector and a first top surface hole formed in the top surface of the ejector, the first side surface holes and the plurality of second holes may be configured to have diameters that gradually increase or reduce in a predetermined direction, and a direction in which the diameters of the first side surface holes increase or reduce and a direction in which the diameters of the plurality of second holes increase or reduce may be opposite each other. A top surface of the mixer may include a discharge plate that is formed as a perforated plate including the plurality of third holes.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
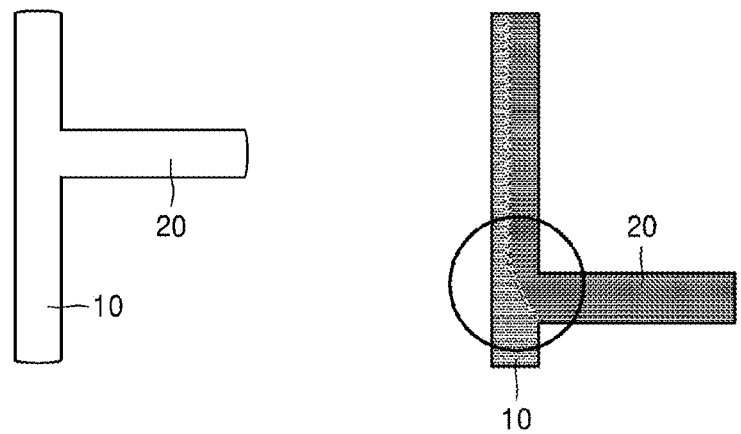
FIG. 1 is a diagram of a mixing tee pipe according to the related art.
Figure 2:
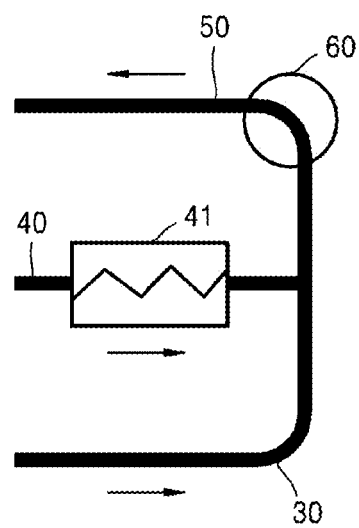
FIG. 2 is a diagram of a mixing tee pipe according to the related art, in which a crack portion is away from the high and low temperature pipes.
Figure 3:
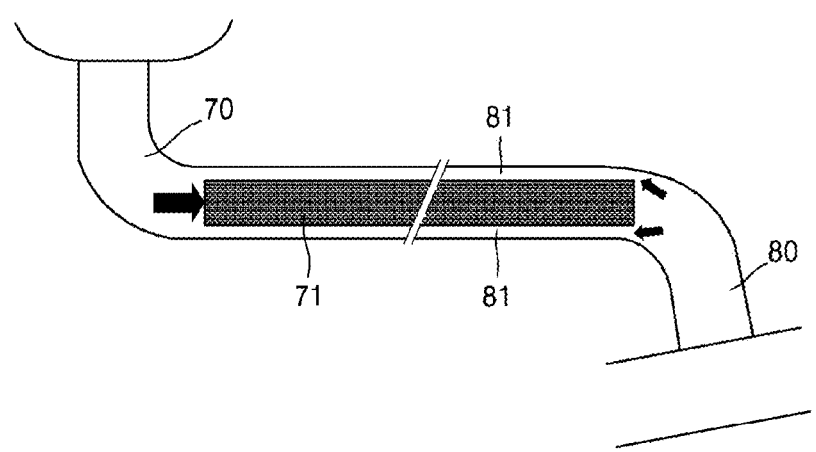
FIG. 3 is a diagram of a mixing tee pipe including separate tubes, according to the related art.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

The present disclosure provides a flow control device for mitigating thermal stratification in a mixing tee pipe, in which a fluid of high temperature and a fluid of low temperature are mixed, so as to prevent damages caused by bending stress according to the thermal stratification and thermal fatigue. Hereinafter, one or more embodiments of the present disclosure will be described below with reference to accompanying drawings.

Figure 4:
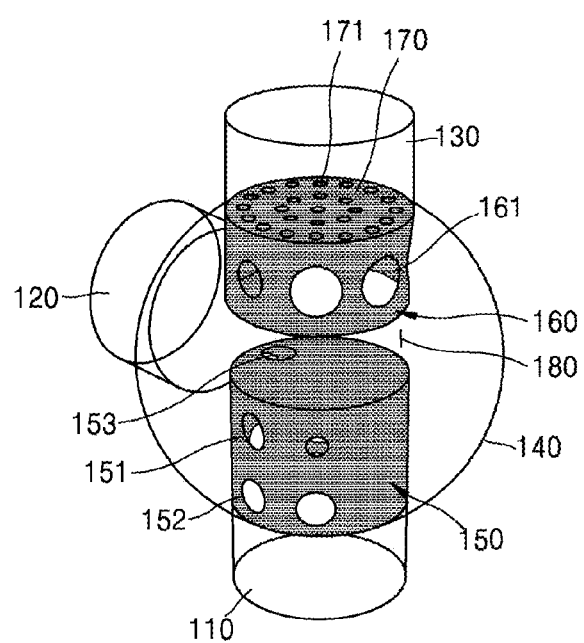
FIG. 4 is a perspective view of a flow control device according to an embodiment of the present disclosure.

Referring to FIG. 4, the flow control device for mitigating thermal stratification in a mixing tee pipe includes a main pipe 110, a branch pipe 120, a mixing tee pipe 130, and a mixing bowl 140.

The main pipe 110 has a tubular shape, through which a fluid may flow, and is connected to the mixing bowl 140. A fluid may flow through the main pipe 110 into the mixing bowl 140.

The branch pipe 120 has a tubular shape and is connected to the mixing bowl 140. A fluid of a different temperature from that of the fluid in the main pipe 110 may flow through the branch pipe 120 into the mixing bowl 140.

The mixing tee pipe 130 has a tubular shape and is connected to the mixing bowl 140. The fluids introduced into the mixing bowl 140 from the main pipe 110 and the branch pipe 120, for example a fluid at a high temperature and a fluid at a low temperature, are mixed in the mixing bowl 140 and are discharged via the mixing tee pipe 130.

Figure 5:
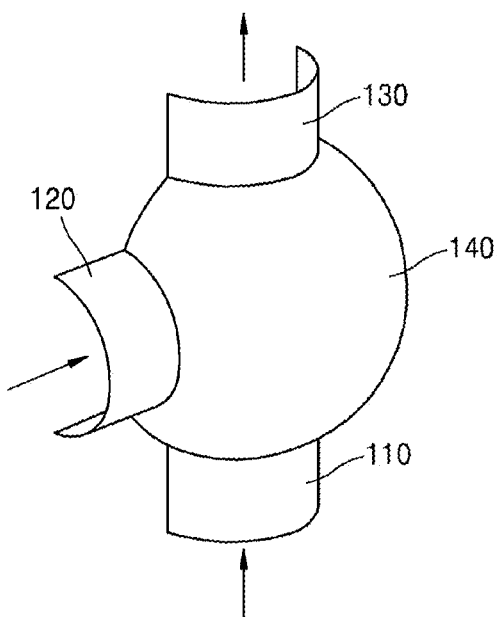
FIG. 5 is a diagram showing flow of a fluid in the flow control device according to an embodiment of the present disclosure.

That is, referring to FIG. 5, the main pipe 110 and the branch pipe 120 are pipes through which the fluid at a high temperature and a fluid at a low temperature are introduced, and the fluids introduced through the main pipe 110 and the branch pipe 120 are mixed in the mixing bowl 140. The fluids mixed in the mixing bowl 140 are discharged through the mixing tee pipe 130.

The mixing bowl 140 is an empty sphere in which the fluids introduced therein through the main pipe 110 and the branch pipe 120 are mixed. That is, the mixing bowl 140 is located in an area where the fluid at a high temperature and the fluid at a low temperature meet each other and provides a space for maximizing control of the flow stream and fluid mixing.

The mixing bowl 140 may include an ejector 150 and a mixer 160 so that the fluids introduced through the main pipe 110 and the branch pipe 120 may be mixed without occurrence of thermal stratification.

Referring to FIG. 4, the ejector 150 is formed as an empty cylinder and is disposed in an area where the main pipe 110 and the mixing bowl 140 are connected to each other.

The ejector 150 has an open bottom for communication with the main pipe 110. That is, the ejector 150 is disposed in the mixing bowl 140 at the point where the liquid from the main pipe 110 is introduced, and since the bottom of the ejector 150 is open, the liquid introduced into the main pipe 110 flows into the ejector 150.

A plurality of first holes 151, 152, and 153 are formed in a side surface and a top surface of the ejector 150. The plurality of first holes 151, 152, and 153 may have different diameters from one another.

According to the embodiment, the first holes 151, 152, and 153 may include first side surface holes 151 and 152 formed in the side surface of the ejector 150 and a first top surface hole 153 formed in the top surface of the ejector 150.

The first side surface holes 151 and 152 are arranged in two rows, that is, first upper side holes 151 are arranged in a first row and first lower side holes 152 are arranged in a second row under the first upper side holes 151.

A plurality of first lower side holes are provided as the first lower side holes 152. The plurality of first lower side holes 152 may have an equal diameter. A plurality of first upper side holes are provided as the first upper side holes 151. The plurality of first upper side holes 151 may have different diameters from one another.

Figure 6:
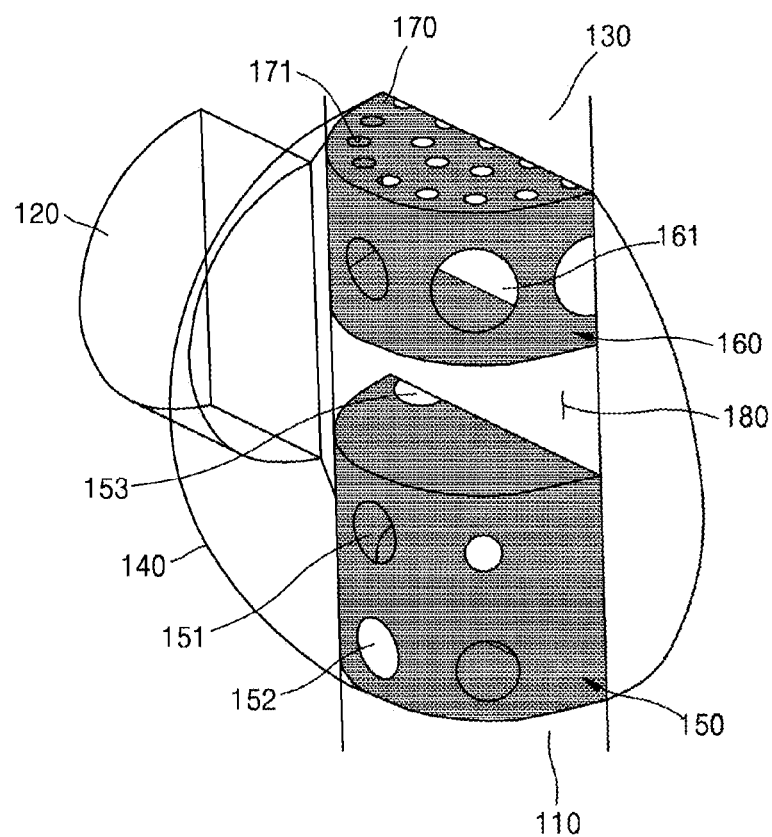
FIG. 6 is an expanded view of FIG. 4.

In more detail, referring to FIG. 6, the first upper side holes 151 may be arranged so that the diameters thereof are gradually reduced from a direction facing the branch pipe 120 from inside the mixing bowl 140 to a direction opposite to the direction facing the branch pipe 120. That is, the first upper side holes 151 may have greater diameter at a portion closer to the branch pipe 120, and may have smaller diameter at a portion farther from the branch pipe 120.

As described above, the first lower side holes 152 are formed to have the same diameter and the first upper side holes 151 are formed to have different diameters taking into account fluid flow from the branch pipe 120 into a separate space 180. Since the first upper side holes 151 are largely affected by the flow from the side surface, the thermal stratification of the mixing tee pipe could be mitigated by varying the diameters of the first upper side holes 151. However, as the flow from the main pipe 110 is constant and the first lower side holes 152 are less affected by the flow from the side surface, varying diameters of the first lower side holes 152 is not necessary. Therefore, the first lower side holes 152 may have the same diameter for convenience of determining a diameter ratio or convenience of manufacturing.

The first top surface hole 153 is formed in the top surface of the ejector 150, and may include a plurality of holes having various diameters. The first top surface hole 153 may include only one hole, and is formed in a portion adjacent to the branch pipe 120. That is, the one first top surface hole 153 is formed in the top surface of the ejector 150 to be closest to the branch pipe 120, and thus, is formed at a location that is most affected by the flow in order to increase mixing efficiency. Although a plurality of first top surface holes 153 may be formed, there is no noticeable effect when a plurality of holes are formed in a side opposite the branch pipe 120, and thus, the first top surface hole 123 may be formed as one hole having a large diameter.

Referring to FIG. 4, the mixer 160 is formed as an empty cylinder, and is disposed in an area where the mixing tee pipe 130 and the mixing bowl 140 are connected to each other.

The mixer 160 has a closed bottom surface, and a plurality of second holes 161 are formed in a side surface of the mixer 160. A plurality of third holes 171 are formed in a top surface of the mixer 160, and the mixing bowl 140 and the mixing tee pipe 130 are communicated with each other via the third holes 171. That is, the mixer 160 is provided in the mixing bowl 140, and is located in an area where the fluid mixed in the mixing bowl 140 is discharged into the mixing tee pipe 130. The fluid mixed in the mixing bowl 140 enters the mixer 160, and is discharged to the mixing tee pipe 130 via the third holes 171 formed in the top surface of the mixer 160. The plurality of second holes 161 and the plurality of third holes 171 may have different diameters from one another. The bottom surface of the mixer 160 may be closed so as to ensure a sufficient time period for mixing of the fluids in the separate space 180.

The top surface of the mixer 160 may include a discharge plate 170 formed as a perforated plate in which the plurality of third holes 171 are formed. The discharge plate 170 is located at a boundary between the mixing tee pipe 130 and the mixing bowl 140, and the fluid in the mixer 160 is discharged to the mixing tee pipe 130 via the third holes 171 in the discharge plate 170.

The plurality of second holes 161 in the mixer 160 may have different diameters from one another. In more detail, referring to FIG. 6, the second holes 161 may be arranged so that the diameters thereof are gradually increased from a direction facing the branch pipe 120 from inside the mixing bowl 140 to a direction opposite to the direction facing the branch pipe 120. That is, the second holes 161 may have smaller diameter at a portion closer to the branch pipe 120, and may have greater diameter at a portion farther from the branch pipe 120.

Processes of mitigating thermal stratification by using the flow control device according to the present disclosure are as follows.

According to an embodiment of the present disclosure, the fluid of high temperature is introduced into the mixing bowl 140 through the main pipe 110, and the fluid of low temperature is introduced to the mixing bowl 140 through the branch pipe 120. Here, the ejector 150 is located in the mixing bowl 140 at a boundary between the mixing bowl 140 and the main pipe 110. The fluid of high temperature introduced through the main pipe 110 is introduced into the ejector 150 having the opening bottom surface, and the fluid introduced through the ejector 150 is discharged to the mixing bowl 140 through the first holes 151, 152, and 153 of the ejector 150.

The first side surface holes 151 and 152 are arranged in two rows in the side surface of the ejector 150, and the first side surface holes 151 and 152 include the first upper side holes 151 and the first lower side holes 152. Since the first upper side holes 151 have greater diameters at the portion closer to the branch pipe 120 and have smaller diameters at the portion farther from the branch pipe 120, an efficiency of mixing with the fluid of low temperature introduced through the branch pipe 120 may be increased.

The first top surface hole 153 formed as one large hole may be formed in the top surface of the ejector 150. The fluid discharged through the first top surface hole 153 is mixed with the fluid of low temperature introduced through the branch pipe 120 while flowing between the ejector 150 and the mixer 160, and thus, the mixing efficiency may be improved. In order to increase the mixture efficiency between the ejector 150 and the mixer 160, the first top surface hole 153 is located at a side of the branch pipe 120 (closer to the branch pipe 120).

The ejector 150 and the mixer 160 provided in the mixing bowl 140 are spaced apart from each other so that the separate space 180 may be generated between the ejector 150 and the mixer 160. The separate space 180 is a space for inducing the mixture of the fluid introduced through the branch pipe 120 and the fluid elevating upward through the main pipe 110. Therefore, in order to mix the fluid introduced through the branch pipe 120 with the fluid elevating upward through the main pipe 110, the ejector 150 and the mixer 160 have to be spaced apart from each other to form the separate space 180.

The mixer 160 is provided to induce mixture of the fluid, in a case where the fluid is discharged to the mixing tee pipe 130 without being sufficiently mixed in the mixing bowl 140. Also, the plurality of second holes 161 are provided in the side surface of the mixer 160 so that the fluid that has been firstly mixed in the mixing bowl 140 may be secondarily mixed.

The second holes 161 formed in the side surface of the mixer 160 are formed to have diameters that gradually increase from the direction facing the branch pipe 120 to the opposite direction. Thus, flow of the fluid is induced so that the fluid introduced from the branch pipe 120 is sufficiently mixed in the internal space of the mixing bowl 140, not directly being discharged to the mixing tee pipe 130, and then, is discharged from the mixing bowl 140.

The fluid mixed in the mixer 160 is finally discharged to the mixing tee pipe 130 through the discharge plate 170 that is formed as the perforated plate including the plurality of third holes 171. Here, the discharge plate 170 may be integrally formed with the mixer 160, or may be separately formed from the mixer 160 and may be coupled to the mixer 160. However, the discharge plate 170 of the present embodiment may be integrally formed with the mixer 160 in order to prevent leakage from a coupling portion.

Referring to FIG. 6, the first side surface holes 151 and 152 of the ejector 150 and the second holes 161 formed in the side surface of the mixer 160 are provided to have diameters that reduce or increase along a predetermined direction, and a direction in which the diameters of the first side surface holes 151 and 152 increase or reduce may be opposite to a direction in which the diameters of the second holes 161 increase or reduce.

That is, the first upper side holes 151 may have the diameters that gradually reduce from the direction facing the branch pipe 120 to the opposite direction, whereas the second holes 161 may have the diameters that gradually increase from the direction facing the branch pipe 120 to the opposite direction. Since the diameters of the first side surface holes 151 and 152 and the diameters of the second holes 161 increase or reduce in opposite directions from each other, a swirling effect of the flow is increased to improve the mixing efficiency of the fluid.

Figure 7:
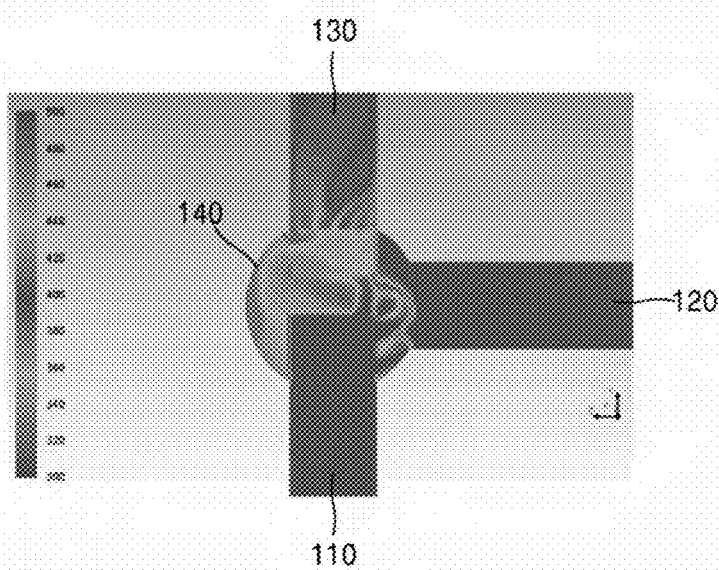
FIG. 7 is a image showing temperature distribution in a flow control device according to an embodiment of the present disclosure.

FIG. 7 is a image showing a temperature distribution of the flow control device for mitigating the thermal stratification in the mixing tee pipe according to an embodiment of the present disclosure. FIG. 7 shows a result of numerical interpretation by using computational fluid dynamics (CFD). Referring to FIG. 7, the fluids introduced from the main pipe 110, in which the fluid of high temperature flows, and the branch pipe 120, in which the fluid of low temperature flows, are mixed to an appropriate temperature and mitigate generation of the thermal stratification while passing through the mixing bowl 140.

The flow control device for mitigating the thermal stratification in the mixing tee pipe according to the present disclosure has following effects.

According to the flow control device for mitigating the thermal stratification in the mixing tee pipe of the present disclosure, the mixing bowl 140 and the ejector 150 and the mixer 160 provided in the mixing bowl 140 may mitigate the thermal stratification in the mixing tee pipe, in which the fluid of high temperature and the fluid of low temperature are mixed. Referring to FIG. 7, the fluid of high temperature and the fluid of low temperature respectively introduced through the main pipe 110 and the branch pipe 120 are shown to be mixed to an appropriate temperature in the mixing bowl 140 while mitigating the thermal stratification.

Figure 8:
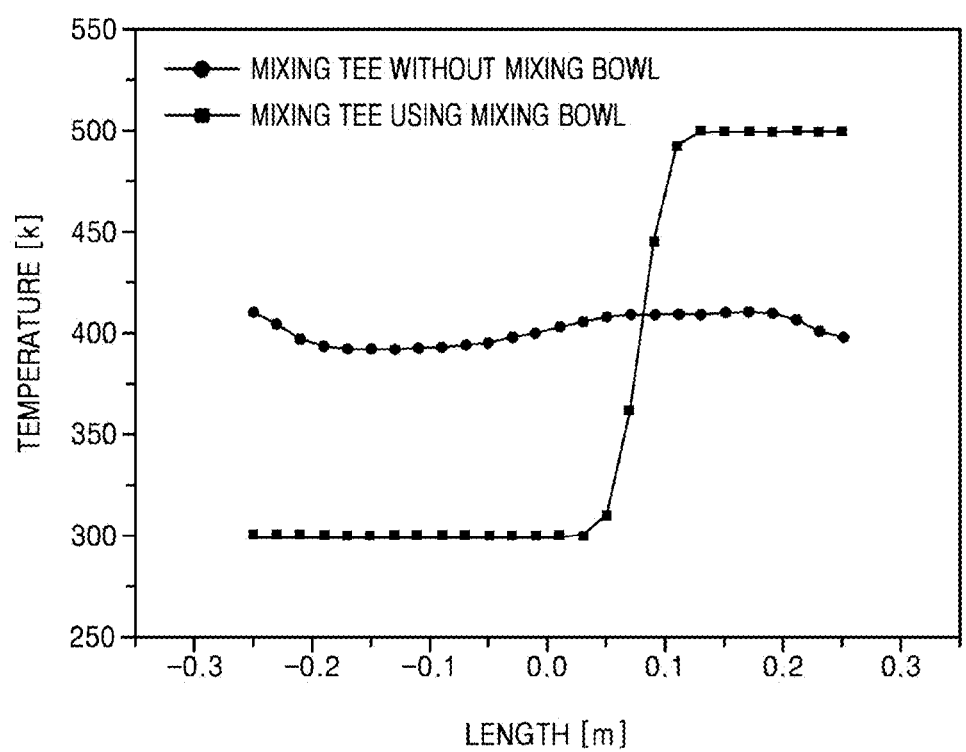
FIG. 8 is a graph showing a temperature variation according to installation of the flow control device according to an embodiment of the present disclosure.

FIG. 8 shows a result of temperature profile between upper and lower ends of a pipe according to the installation of the flow control device of the present disclosure, at a starting point of the mixing tee pipe, where the thermal stratification phenomenon severely occurs, for qualitative comparison. FIG. 8 compares a case in which the flow control device is installed with a case where the flow control device of the present disclosure is not installed, that is, the example illustrated in FIG. 1, and shows a result of numerical interpretation by using the CFD.

Referring to FIG. 8, in a case where the flow control device according to the present disclosure is not installed (see FIG. 1), a temperature difference between the upper and lower ends of the pipe was 300K prior to the starting point of the mixing tee pipe, but increased to 500K after the starting point of the mixing tee pipe. That is, when the flow control device according to the present disclosure was not installed, the temperature variation of about 200K was shown. However, when the flow control device according to the present disclosure was installed, a temperature value of about 400K was obtained before and after the starting point of the mixing tee pipe, and the temperature variation was very small.

As described above, according to the flow control device of the present disclosure, the thermal stratification may be mitigated, and damages due to the bending stress and the thermal fatigue caused by the thermal stratification may be prevented.

The flow control device according to the present disclosure prevents occurrence of the thermal stratification through the mixing bowl 140, that is, prevents the thermal stratification by using the natural flow of the fluid without using a mechanical device that requires external electric power or driving power. Thus, the flow control device of the present disclosure is economically efficient, and is safe because an inoperable state due to loss of electric power may be prevented.

Also, the flow control device according to the present disclosure does not need to perform an additional experiment or a three-dimensional analysis for finding a point vulnerable to the thermal stratification/thermal fatigue, and thus, is economically efficient. In addition, the flow control device may be manufactured as an additional module to be installed on a part of the pipe, and thus, it is easy to perform maintenance.

Additionally, since the flow control device of the present disclosure is only installed on a point where the high temperature pipe and the low temperature pipe meet each other, the flow control device does not occupy a large volume. Therefore, an additional installing space is not required, and there is no spatial restriction in installing the flow control device.

Since the flow control device prevents damages on the pipe due to the thermal stratification, the lifespan of the pipes is expected to extend, and thus, radioactive leakage caused by the pipe damages may be prevented, and the flow control device may contribute to ensuring of safety in a nuclear plant.

The flow control device for mitigating the thermal stratification in the mixing tee pipe according to the present disclosure may be used as follows. Flow amounts of the fluids introduced into the main pipe 110 and the branch pipe 120 may be different from each other, and in this case, the diameter ratio between the first side surface holes 151 and 152 of the ejector 150 and the second holes 161 formed in the mixer 160 may be adjusted to increase the mixing efficiency. If the flow amount of the fluid introduced into the main pipe 110 is greater, the diameter ratio of the first side surface holes 151 and 152 with respect to the second holes 161 is adjusted to increase, and if the flow amount of the fluid introduced into the branch pipe 120 is greater, the diameter ratio of the second holes 161 with respect to the first side surface holes 151 and 152 may be adjusted to increase.

According to the flow control device for mitigating the thermal stratification in the mixing tee pipe of the present disclosure, the mixing bowl and the ejector and the mixer provided in the mixing bowl may mitigate the thermal stratification in the mixing tee pipe, in which the fluid of high temperature and the fluid of low temperature are mixed. As such, the damages caused by the bending stress and the thermal fatigue according to the thermal stratification may be prevented.

The flow control device according to the present disclosure removes the thermal stratification in the mixing bowl, and thus, does not need to change the pipe arrangement. Therefore, the flow control device may be installed in the plant in operation or the plant that has been constructed or under construction.

The flow control device of the present disclosure is economically efficient in that the mechanical device requiring the external electric power or operating power is not needed because the thermal stratification is removed using only natural flow in the mixing bowl, and that an additional experiment or three-dimensional analysis for finding the vulnerable point to the thermal stratification/thermal fatigue is not necessary.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concept as defined by the following claims.

What is claimed is:

1. A flow control device for mitigating thermal stratification in a mixing tee pipe, the flow control device comprising:
    a mixing bowl having an empty sphere shape;
    a main pipe having a tubular shape and connected to the mixing bowl, wherein a fluid flows through the main pipe;
    a branch pipe having a tubular shape and connected to the mixing bowl, wherein a fluid flows through the branch pipe;
    a mixing tee pipe having a tubular shape, through which a fluid in the mixing bowl flows, and connected to the mixing bowl, wherein the fluid introduced from the main pipe and the fluid introduced from the branch pipe are mixed in the mixing bowl and are discharged through the mixing tee pipe; and
    an ejector and a mixer arranged in the mixing bowl, wherein the ejector has an empty cylindrical shape and is disposed in an area where the main pipe and the mixing bowl are connected to each other, the ejector has an open bottom surface in communication with the main pipe and comprises a plurality of first holes in a side surface and a top surface thereof, the mixer has an empty cylindrical shape and is disposed in an area where the mixing tee pipe and the mixing bowl are connected to each other, and the mixer comprises a plurality of second holes in a side surface thereof and a plurality of third holes in a top surface thereof, so that the mixer communicates with the mixing tee pipe through the plurality of third holes, and wherein the plurality of first holes of the ejector comprise first side surface holes formed in the side surface of the ejector and a first top surface hole formed in the top surface of the ejector, the first side surface holes and the plurality of second holes are configured to have diameters that gradually increase or reduce in a predetermined direction, and a direction in which the diameters of the first side surface holes increase or reduce and a direction in which the diameters of the plurality of second holes increase or reduce are opposite each other.

2. The flow control device of claim 1, wherein the plurality of first holes have different diameters from one another, the plurality of second holes have different diameters from one another, and the plurality of third holes have different diameters from one another.

3. The flow control device of claim 1, wherein the ejector and the mixer arranged in the mixing bowl are spaced apart from each other to form a separate space therebetween.

4. The flow control device of claim 1 wherein the ejector further comprises lower side holes having the same diameter, and the first side surface holes have diameters that are gradually reduced from a direction facing the branch pipe to a direction opposite the direction facing the branch pipe.

5. The flow control device of claim 1, wherein the first top surface hole is located in a portion of the top surface closest to the branch pipe.

6. The flow control device of claim 1, wherein the plurality of second holes of the mixer have diameters that are gradually increased from a direction facing the branch pipe to a direction opposite the direction facing the branch pipe.

7. The flow control device of claim 1, wherein a top surface of the mixer comprises a discharge plate that is formed as a perforated plate including the plurality of third holes.

* * * * *